United States Patent
Lin et al.

(10) Patent No.: US 7,434,140 B2
(45) Date of Patent: Oct. 7, 2008

(54) APPARATUS FOR ACCESSING AND TRANSFERRING OPTICAL DATA

(75) Inventors: Li-Lien Lin, Hsin Chu (TW); Wen-Yi Wu, Chu Pei (TW)

(73) Assignee: Mediatek Inc., Hsin-chu (TW)

( * ) Notice: Subject to any disclaimer, the term of this patent is extended or adjusted under 35 U.S.C. 154(b) by 535 days.

(21) Appl. No.: 11/042,085

(22) Filed: Jan. 26, 2005

(65) Prior Publication Data
US 2005/0229081 A1 Oct. 13, 2005

(30) Foreign Application Priority Data
Apr. 9, 2004 (TW) .............................. 93110029 A

(51) Int. Cl.
*H03M 13/00* (2006.01)
(52) U.S. Cl. ...................... 714/758; 714/755; 714/763; 714/784; 714/786
(58) Field of Classification Search ................. 714/752, 714/758, 784, 786, 755, 763
See application file for complete search history.

(56) References Cited

U.S. PATENT DOCUMENTS

| | | | | |
|---|---|---|---|---|
| 5,831,955 A | * | 11/1998 | Arataki et al. ............ 369/47.32 |
| 6,158,039 A | * | 12/2000 | Cho et al. .................... 714/769 |
| 6,332,207 B1 | * | 12/2001 | Southerland et al. ......... 714/763 |
| 6,618,331 B2 | * | 9/2003 | Shieh ....................... 369/30.11 |
| 6,742,156 B2 | * | 5/2004 | Shieh .......................... 714/756 |
| 6,742,157 B2 | * | 5/2004 | Shieh et al. .................. 714/758 |
| 6,907,559 B2 | * | 6/2005 | Hall et al. .................... 714/769 |
| 7,055,082 B2 | * | 5/2006 | Mori et al. ................... 714/768 |

* cited by examiner

*Primary Examiner*—Esaw Abraham
(74) *Attorney, Agent, or Firm*—Birch, Stewart, Kolasch & Birch, LLP

(57) ABSTRACT

An apparatus for accessing and transferring optical data has a memory supporting the page-mode function, an accessing device used to access an error correction block from the optical storage medium and store it into the memory to make the portion of data in the same column of the error correction block stored in a particular locality greater than the portion of data in the same row of the error correction block stored in the particular locality, and an error correction decoder used to access the data of the error correction block to perform the error correction process. The apparatus uses the feature of the DRAM, such as page-mode function, and the data arrangement of the memory to improve the access efficiency of the memory. The apparatus can thus increase the access speed of the error correction decoder and improve the accessing efficiency.

18 Claims, 10 Drawing Sheets

APPARATUS FOR ACCESSING AND TRANSFERRING OPTICAL DATA

BACKGROUND OF THE INVENTION

1. Field of the Invention

The present invention is directed to an apparatus for accessing and transferring optical data, and more particularly, to an apparatus that can be applied to decoding means of the Blu-ray disk.

2. Description of the Related Art

Conventional optical disks, such as digital versatile disks (DVD) or video compact disks (VCD), are extensively used in business activities or family life. They are usually used to store a mass of video, audio or other digital data, such as movies, music files, application software, etc. In order to make the optical disks able to have a larger storage capacity, a standard of the Blu-ray disk has been defined recently to satisfy the future requirements of users, in which the Blu-ray disk has a storage capacity more than five times greater than that of a DVD.

Reference is made to FIG. 1, which is a flowchart diagram for illustrating the decoding process of the Blu-ray disk. Firstly, the decoding means of the Blu-ray disk will divide the user data into frames, each of which has 2048 data bytes and 4 bytes error detection codes, and 32 frames of the user data will be taken to form a data frame 200.

The data frame 200 will be re-arranged to form the data block 202, which is a data matrix with 304 columns and 216 rows. Further, before being re-arranged, every frame of the user data will be scrambled to form a scrambled data frame.

Thereafter, the encoding means will generate 32 parity rows of long distance error-correction codes (LDC) for every data block 202 to form a LDC block 204. Every column of the LDC block 204 is a LDC code. Hence, one LDC block 204 has 304 LDC codes.

Subsequently, the LDC block 204 will be re-arranged to form a LDC cluster 206, which is a data matrix with 152 columns and 496 rows. In the re-arranging process, the LDC block 204 will be interleaved twice to reduce burst errors.

On the other hand, for data accessing, the logical address and control data 208 and physical address 210 are added to the encoding process, in which these data and addresses are also encoded. For every user frame 200, the encoding means will provide the logical address and control data 208 for 32×18 bytes and physical address 210 for 16×9 bytes.

In the encoding process, the logical address and control data 208 and physical address 210 will be combined and re-arranged to form an access block 212, which is a data matrix with 24 columns and 30 rows.

Thereafter, the encoding means will generate 32 parity rows of the burst indicator subcode (BIS) for the access block 212 to form a BIS block 214. Every BIS block 214 will be re-arranged to form a BIS cluster 216, which is a data matrix with 3 columns and 496 rows. In the re-arranging process, the BIS block 214 will be interleaved once.

After the LDC cluster 206 and the BIS cluster 216 are formed, the encoding means will divide the LDC cluster 206 into four equal parts and divide the BIS cluster 216 into three equal parts. Thereafter, the encoding means will insert the BIS cluster 216 into the LDC cluster 206 and provide a frame sync to form a physical cluster 218. Lastly, the encoding means will modulate the data of the physical cluster 218 and proceed with the recoding procedure to form an error correction modulation block on the optical disk.

During data accessing operation, a conventional accessing/transferring apparatus will use an optical reading head to access the data recorded on the optical disk, de-modulate the accessed data and abstract the LDC and BIS data.

In the data accessing process, the conventional accessing/transferring apparatus will de-interleave the LDC and BIS data respectively to recover the LDC block and BIS block. The LDC data should be de-interleaved twice and the BIS data should be de-interleaved once only.

In addition, after de-interleaving, the conventional accessing/transferring apparatus will use the parities of the LCD and BIS to correct the LDC and BIS data and use the error detection codes of the data frame 200 to check the LDC data to ensure that the data passed to the host is correct.

Therefore, in the accessing process, the conventional accessing/transferring apparatus will perform an error correction process for every error correction block, i.e. the LDC block 204 or the BIS block 214, and then output the results.

The error correction block is a matrix with multiple columns and multiple rows. Every column of the matrix is a decoding unit for error correction and every row is a storage unit for recoding data in order on the optical disk. For forming the error correction modulation block, the order of the modulated data of the data row recoded in the optical disk is related to the order of the data of the data row of the error correction block.

In the data accessing process, the data of the LDC block 204 and BIS block 214 will be temporarily stored in a dynamic random access memory (DRAM) of the conventional accessing/transferring apparatus for performing the error correction process. Taking the LDC block 204 as an example, reference is made to FIG. 2, which is a diagram for showing the arrangement of the LDC data stored in the DRAM in compliance with the prior art. The direction of the arrow indicates the direction of the address arrangement of the DRAM. When the conventional accessing/transferring apparatus accesses the LDC block 204 for performing the error correction process, it will take out the data of the LDC block 204 from the DRAM column by column.

However, in the prior art, in order to access the data more efficiently, the DRAM usually has a page-mode function, which makes the data with the same row address, i.e. in the same memory page, accessible by sending the row address when accessing the first data and only sending the column address when accessing the following data.

Moreover, since the DRAM will only charge a memory block with the same row address to activate the memory block at a time, the DRAM not only needs to send out a row address but also needs to wait a predetermined charging time when accessing the data with a different row address. Hence, if the number of switching times of different row addresses increases, the efficiency of the DRAM is considerably reduced.

In the accessing process of the LDC block 204, although the conventional accessing/transferring apparatus can store the accessed data into the DRAM continuously, it usually needs to access the data with different row addresses during decoding and transmission processes. As described above, since using the memory block with different row addresses needs to wait a predetermined charging time, the accessing efficiency of the LDC block 204 will be restricted. Hence, the conventional accessing/transferring apparatus will consume a lot of time when accessing the data from the optical disk.

In accordance with the description above, since the conventional accessing/transferring apparatus needs to perform page-crossing access many times in the data accessing operation, its accessing efficiency is limited considerably.

Accordingly, as discussed above, the prior art still has some drawbacks that could be improved. The present invention aims to resolve the drawbacks in the prior art.

SUMMARY OF THE INVENTION

An objective of the present invention is to provide an accessing/transferring apparatus to improve the accessing efficiency of optical data via improving the accessing efficiency of the memory.

Another objective of the present invention is to provide an accessing/transferring apparatus, which can be applied as a Blu-disk accessing/transferring apparatus to improve the decoding and accessing efficiency of the Blu-ray disk.

Still another objective of the present invention is to provide an accessing/transferring apparatus, which can use the feature of the DRAM, such as page-mode function, and the data arrangement of the memory to control efficiently memory access.

Still another objective of the present invention is to provide an accessing/transferring apparatus, which uses a novel decoding process to decode the error correction codes and error detection codes so as to reduce the number of accessing operations of the memory and efficiently access the optical data thereby.

For reaching the objective above, the present invention provides an accessing/transferring apparatus, including an accessing device used to access the error correction block from an optical disk and store the same into a memory, and an error correction decoder to access the error correction block by column to perform an error correction process.

Numerous additional features, benefits and details of the present invention are described in the detailed description, which follows.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF PREFERRED EMBODIMENTS

Figure 1:
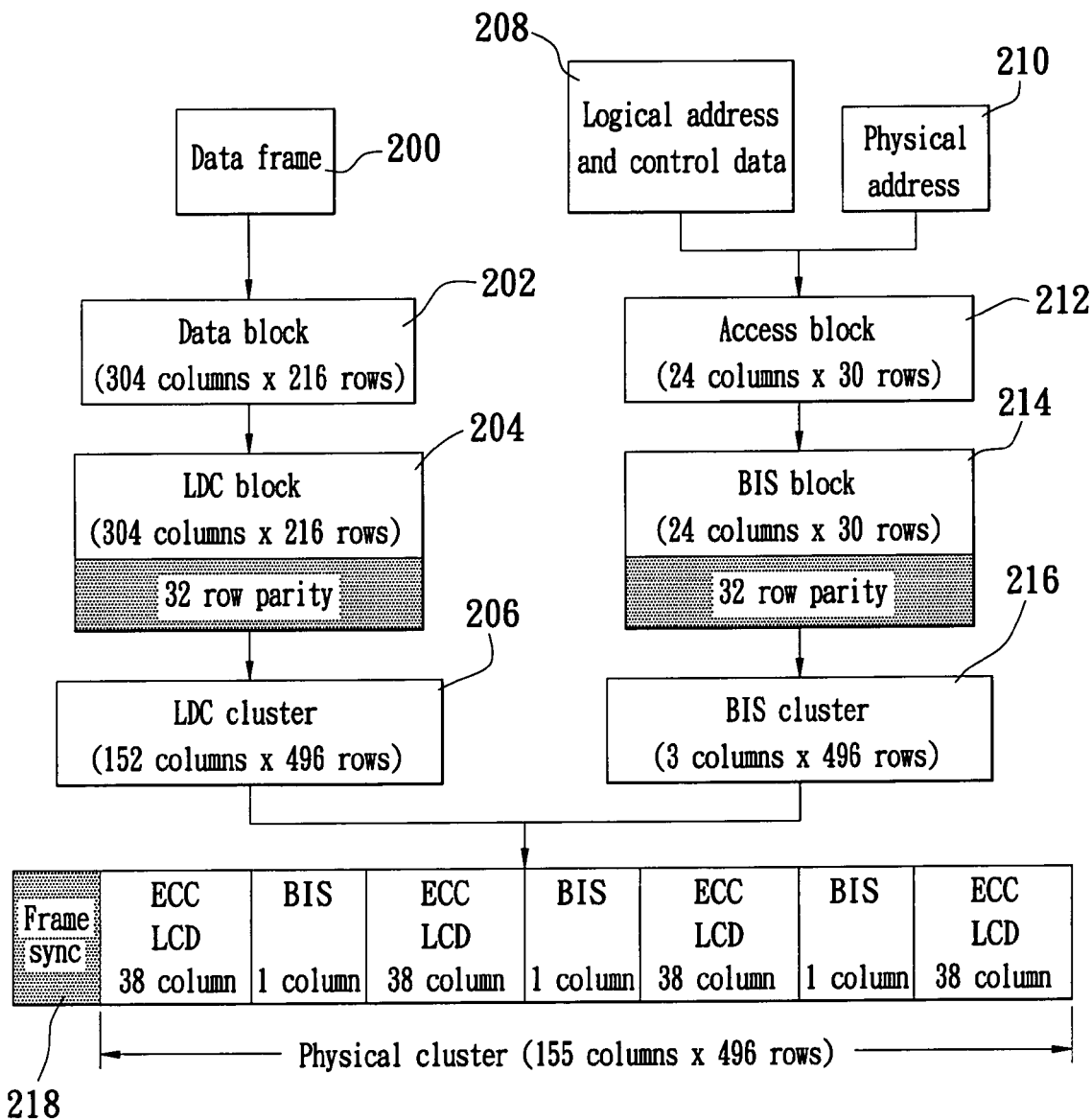
FIG. 1 is a flowchart diagram for illustrating the decoding process of the Blue-ray disk in compliance with the prior art.
Figure 2:
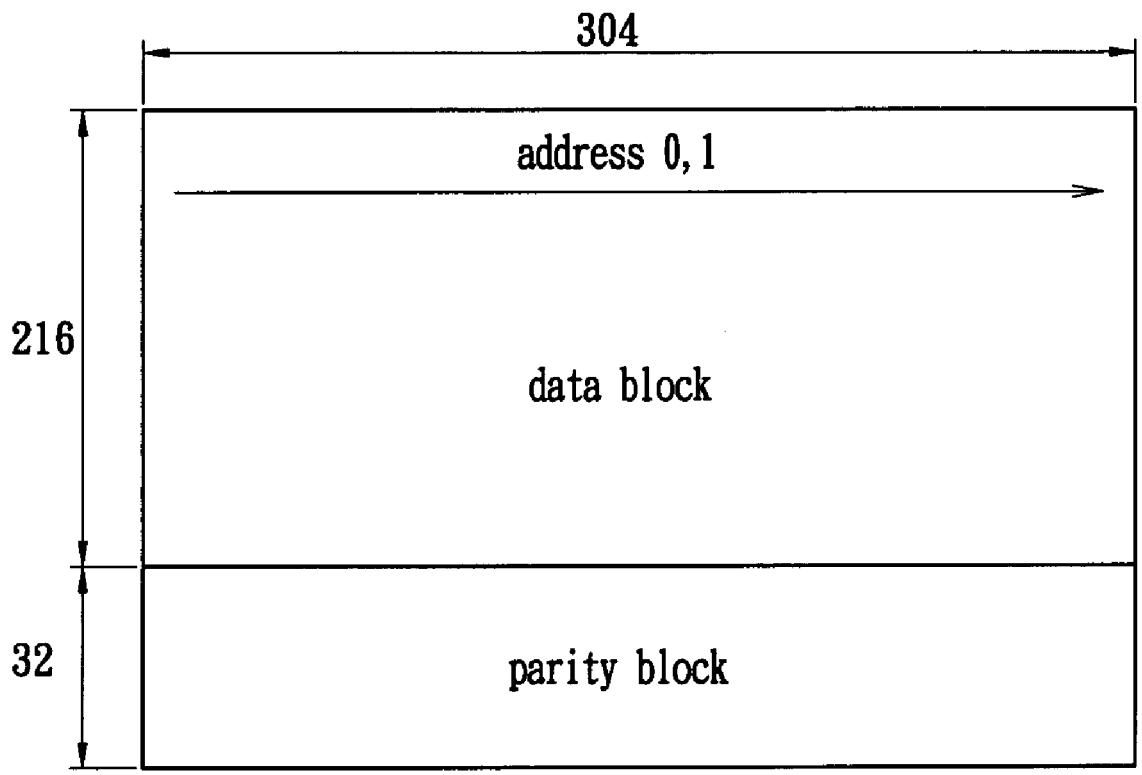
FIG. 2 is a diagram for showing the arrangement of the LDC data stored in the DRAM in compliance with the prior art.
Figure 3:
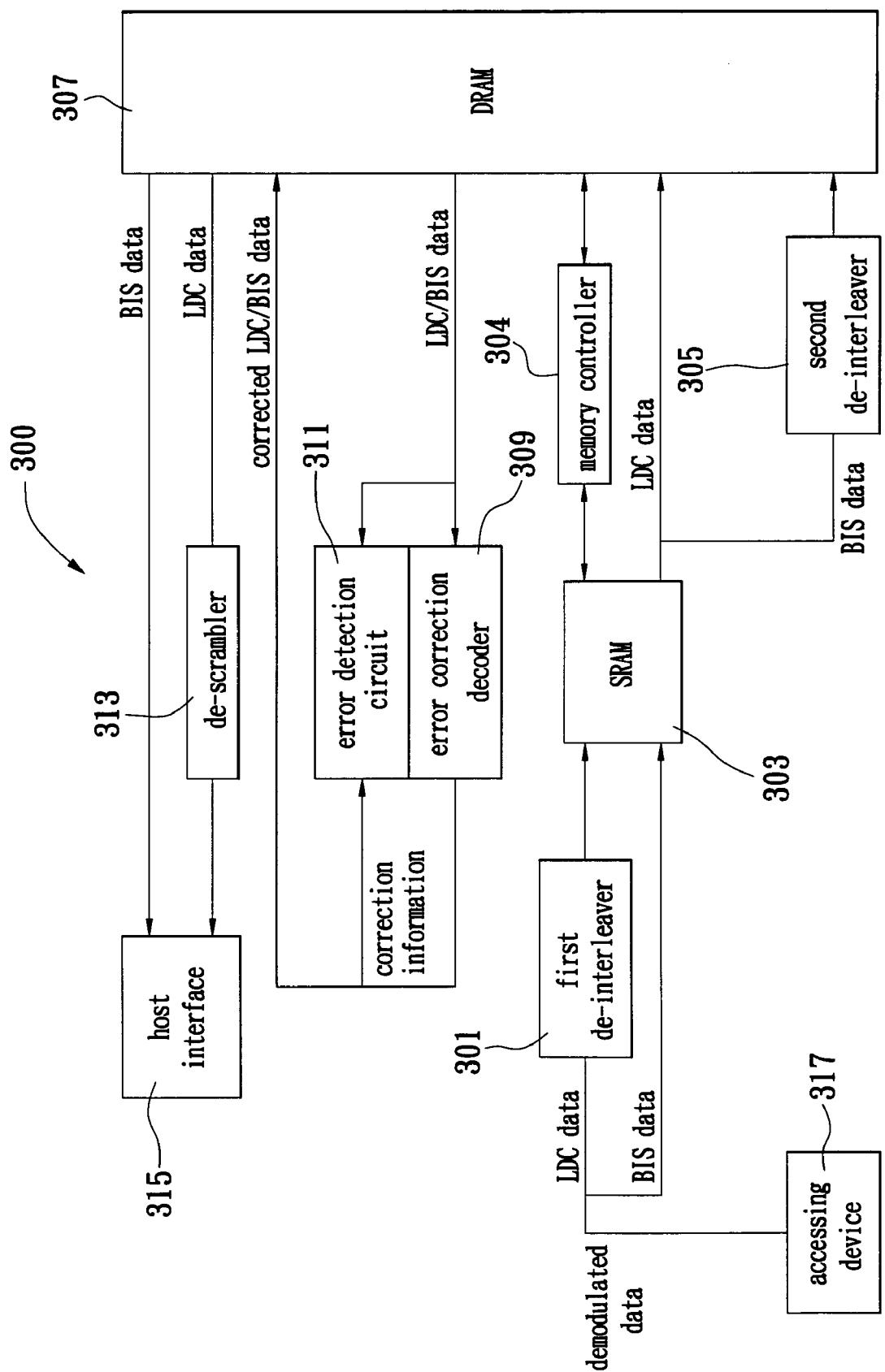
FIG. 3 is a block diagram of the first preferred embodiment in accordance with the present invention.

Reference is made to FIG. 3, which is a block diagram of the first preferred embodiment in accordance with the present invention. The accessing/transferring apparatus 300 includes a first de-interleaver 301, a static random access memory (SRAM) 303, a memory controller 304, a second de-interleaver 305, a DRAM 307, an error correction decoder 309, an error detection circuit 311, a de-scrambler 313, a host interface 315 and an accessing device 317.

In the process of accessing optical data, the CD-ROM drive will access the data of the error correction modulation block via the accessing device 317, which has a optical reading head and a de-modulator (not shown). The CD-ROM drive will use the optical reading head to read the data of the error correction modulation block recorded on the optical disk and use the de-modulator to de-modulate the data of the error correction modulation block.

After the accessing/transferring apparatus 300 obtains the data of the error correction modulation block, it will abstract the LDC data and deliver it to the first de-interleaver 301. The remaining BIS data will be directly stored in the SRAM 303.

The first de-interleaver 301 will generate corresponding addresses of the LDC data to perform two kinds of de-interleaving calculations so as to recover the order of the LDC data and store the LDC data in the SRAM 303, in order.

Moreover, since the order of the LDC data can be recovered after performing the de-interleaving calculations, the LDC data can be restored to a data matrix with 304 columns and 248 rows. The first 216 rows of the data matrix form a data block, which is the target data a user wants to access, and the last 32 rows form a parity block, which are the parity codes of the target data.

Besides, in a practical accessing/transferring apparatus, the capacity of the SRAM is usually much smaller than that of the DRAM due to the cost. Hence, the SRAM can only store part of the data matrix of the LDC data generally, i.e. several rows of the data matrix.

Therefore, the SRAM 303 used in the present invention is assumed to have a capacity able to accommodate several rows of the data matrix. However, the capacity of the SRAM 303 is not limited in the present invention. The SRAM 303 can be a memory able to accommodate a row of the data matrix, only, or a whole data matrix for further improving the efficiency of the present invention.

After storing the LDC data and BIS data into the SRAM 303, the accessing/transferring apparatus 300 will use the memory controller 304 to control the SRAM 303 and DRAM 307 to access the LDC data from the SRAM 303 and store it into the DRAM 307. Meanwhile, the accessing/transferring apparatus 300 will also deliver the BIS data to the second de-interleaver 305 for de-interleaving.

The second de-interleaver 305 will only perform a kind of de-interleaving calculation for the BIS data. The second de-interleaver 305 will generate corresponding addresses of the BIS data to recover the order of the BIS data and store the BIS data in the DRAM 307, in order.

It should be noted that the second de-interleaver 305 will perform a de-interleaving calculation on the BIS data to generate de-interleaving addresses of the SRAM 303 and DRAM 307. Then, it will access the BIS data from the SRAM 303 and store the same in the DRAM 307 according to the dc-interleaving addresses so as to recover the BIS block. The de-interleaving addresses of the DRAM 307 stores the BIS data in the DRAM 307 according to a predetermined method. That will make the data in the same column of the BIS block have a greater portion of locality than the data in the same row of the BIS block.

In practice, the present invention can also be designed to function without the SRAM 303 to lower the cost and promote the efficiency thereof. Without the SRAM 303, the first de-interleaver 301 will still generate corresponding addresses of the LDC data to perform two kinds of de-interleaving calculations so as to recover the order of the LDC data. However, after performing de-interleaving calculations, it will directly store the LDC data into the DRAM 307 via the memory controller 304. It should be noted that the first de-interleaver 301 performs the de-interleaving calculations on the LDC data to generate the corresponding addresses of the DRAM 307 and then stores the LDC data in the DRAM 307 according to the corresponding addresses.

Figure 4:
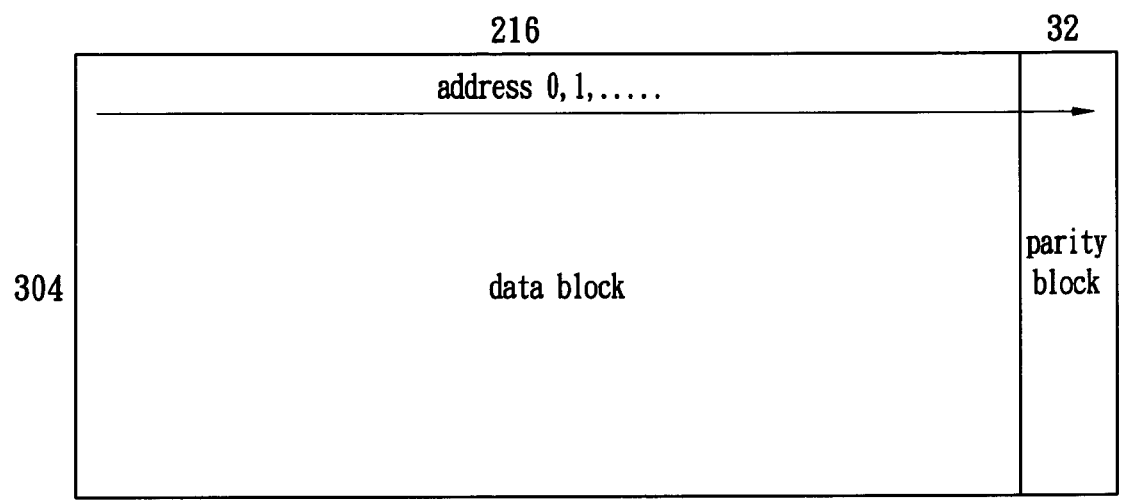
FIG. 4 is a diagram for showing the arrangement of the LDC data stored in the DRAM in accordance with the present invention.

Reference is made to FIG. 4, which is a diagram for showing the arrangement of the LDC data stored in the DRAM in accordance with the present invention. As shown in the figure, in the storage process of the DRAM 307, the columns and the rows of the data matrix of the LDC data are transposed to form a transposed data matrix having 248 columns and 304 rows. The direction of the arrow indicates the direction of the address arrangement of the DRAM 307.

As described above, the SRAM 303 used in the present invention can accommodate multiple rows of the data matrix of the LDC data. Hence, in the storage process of the DRAM 307, the accessing/transferring apparatus 300 can access multiple rows of the data matrix from the SRAM 303 and store them into the DRAM 307 to form multiple columns of the transposed data matrix.

Figure 5:
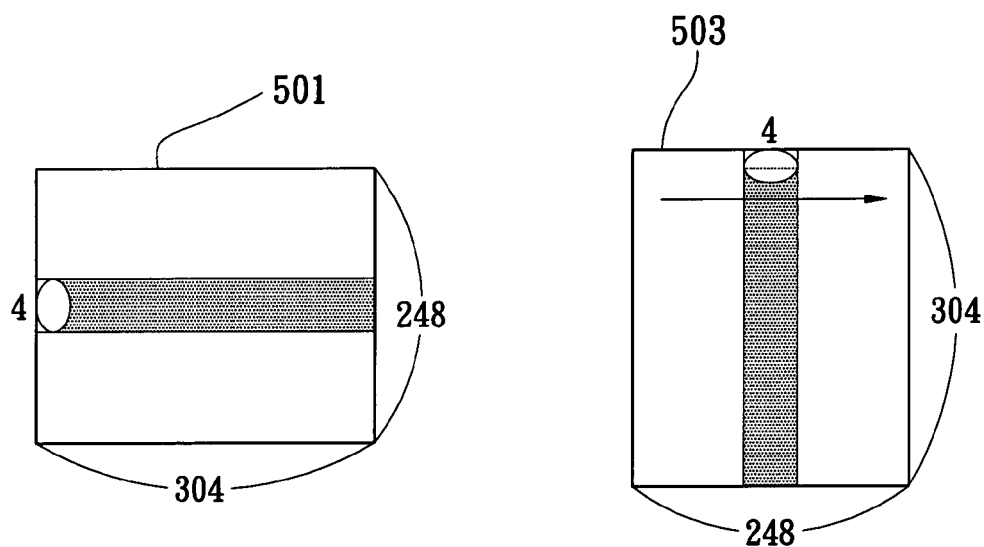
FIG. 5 is a diagram to illustrate the storage process of the DRAM in accordance with the present invention.

In order to clarify the present invention, reference is made the FIG. 5, which is a diagram illustrating the storage process of the DRAM in accordance with the present invention. As shown in the figure, the SRAM 303 used in the present invention can accommodate four rows of the data matrix 501 of the LDC data and has the gray portion of the data matrix 501 stored therein.

In the storage process of the DRAM 307, each time the accessing/transferring apparatus 300 accesses four bytes of the LDC data located in the same column from the SRAM 303 and then stores the same in order in the DRAM 307, in the same row of the transposed data matrix. After completing the storage process, the four row of the data matrix 501 of the LDC data stored inside the SRAM 303 will be stored into the DRAM 307 as four columns of the transposed data matrix 503. The direction of the arrow indicates the direction of the address arrangement of the DRAM 307.

As shown in FIG. 5, in the storage process of the DRAM 307, four data columns are formed in the DRAM 307; i.e., a data matrix with four columns is formed. Since the data in the same row of this data matrix formed by the four data columns primarily have the same row address, i.e. they are primarily located in the same memory page, they can be stored almost continuously in the storage process to save time. However, if the SRAM 303 does not exist, only one row of the data matrix of the LDC data at a time can be stored to form a data column in the DRAM 307. Since the addresses of the data in the data column roughly belong to different memory pages, page-mode function cannot be used to reduce time consumption. Hence, via using the SRAM 303, the present invention can use the page-mode function of the DRAM 307 to store the data so as to reduce the time consumption for storing data.

Through employing the method described above, when the data matrix 501 is completely stored into the DRAM 307, the data in the same column of the data matrix 501 will be placed in a locality, which roughly belongs to the same memory page, to make the portion of data in the same column of the data matrix 501 stored in the same memory page much greater than the portion of data in the same row of the data matrix 501 stored in the same memory page.

Reference is made to FIG. 3 again. After the accessing/transferring apparatus 300 completely stores the LDC and BIS data into the DRAM 307 according to the method described above, the accessing/transferring apparatus 300 will perform error detection and correction processes on these data. The LDC and BIS data are delivered to the error correction decoder 309 and the error detection circuit 311. The error correction decoder 309 will use the parity data of the LDC and BIS data to perform the decoding process and correct the errors inside the LDC and BIS data. The error detection circuit 311 will use the error detection codes of the data frames to perform the error detection process.

When the error correction decoder 309 is performing the error correction process on the LDC data, it accesses the LDC codes from the DRAM 307 in order, according to the arrangement of the transposed data matrix shown in FIG. 4. Since each of the LDC codes is stored in a particular locality, i.e. all data in the LDC codes are roughly stored in the same memory pages or have the same row addresses, and the DRAM 307 has the page-mode function, the LDC codes can be accessed almost continuously so that the time consumption for data accessing is reduced considerably.

In the present invention, when the data are accessed from the optical disk and stored into the DRAM, the data cannot be placed in order in particular localities of the DRAM. Hence, the storage efficiency of the present invention is lower than that of the conventional method. However, when accessing the data from the DRAM, the present invention can access in order the data stored in particular localities, while the conventional method cannot access the data with continuous addresses due to its data arrangement of the DRAM; i.e. the conventional method cannot access in order the data stored in particular localities. Hence, the accessing efficiency of the present invention is higher than that of the conventional method. Accordingly, when the data are stored and accessed once, the efficiency of the conventional method is similar to that of the present invention.

However, during the data storage process, since the present invention can store four bytes of the data at a time into continuous addresses, i.e. storing them into a particular locality, the storage efficiency can be improved. Hence, when compared to the prior art, the method of the present invention can access the DRAM 307 more efficiently in the error correction process.

Furthermore, since the accessing/transferring apparatus 300 can correct and detect the errors of the LDC and BIS data at the same time, the accessing/transferring apparatus 300 only needs to access the LDC and BIS data once in the error correction and detection processes. Hence, when compared to the prior art, the present invention can lower the number of data access operations and improve the efficiency thereby.

After completing the decoding processes of the LDC and BIS codes, the accessing/transferring apparatus 300 will deliver the BIS data to the host interface 315 so as to pass the user control data and logical addresses of the BIS data to the host (not shown).

Furthermore, the accessing/transferring apparatus 300 will also access the LDC data and de-scramble them via the de-scrambler 313 to recover the original data. Finally, the accessing/transferring apparatus 300 will pass the data to the host via the host interface 315. Thus, the accessing of the optical data is finished. The host interface can be a video or audio transmission interface and the transmitted data can be video or audio data.

It should be noted that the accessing/transferring apparatus 300 will access the DRAM 307 to take out the LDC data by row according to the arrangement of the transposed data matrix as shown in FIG. 4 for data transmission. Hence, via using the page-mode function of the DRAM 307, the present invention can continuously access the LDC data due to the continuity of the addresses of the data, i.e. the data are located in order in some particular localities. The conventional method cannot access the data located in continuous addresses, i.e. the data are not located in order in some particular localities, due to the data arrangement thereof. Hence, considering the overall performance, the present invention does not store the data continuously once, but it can twice access the data continuously. However, the conventional method can store the data continuously once, but it cannot twice access the data continuously. Hence, when compared to the prior art, the present invention is more efficient.

Figure 6:
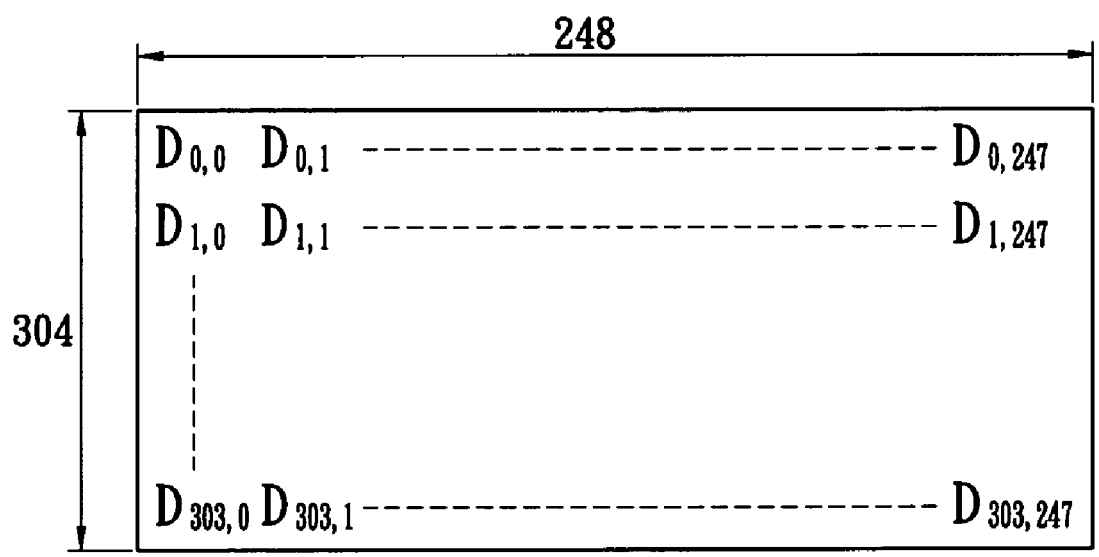
FIG. 6 is a schematic diagram of the transposed data matrix of the LDC block.

In order to clarify the present invention, reference is made to FIG. 6 and FIGS. 7A-F. FIG. 6 is a schematic diagram of the transposed data matrix of the LDC block. FIGS. 7A-F illustrate the data arrangements of the LDC data inside the DRAM in accordance with the present invention. The directions of the arrows in FIGS. 7A-F are the directions of the address arrangement of the DRAM 307.

As shown in FIG. 6, the LDC block can be represented as a transposed data matrix with 248 columns and 304 rows ($D_{i,j}$, i=0-303, j=0-247). Each of the data rows in the transposed data matrix ($D_{i,0}$-$D_{i,247}$, i=0-303) is a set of LDC code and forms a unit for the accessing/transferring apparatus 300 to perform the decoding process.

Since each of the data rows in the transposed data matrix forms a unit for the accessing/transferring apparatus 300 to perform the decoding process, the present invention will store the data in the same row of the transposed data matrix into the same memory page (i.e. the locality with the same row address), as far as possible. The accessing/transferring apparatus 300 can thus use the page-mode function of the DRAM 307 to lower the consumption time of data access.

In practice, the data arrangement of the LDC data in the present invention can have various types, such as shown in FIGS. 7A-F. The directions of the arrows are the directions of the address arrangement of the DRAM 307. The embodiments shown in FIGS. 7A-F have a common feature, which is to store the data in the same row of the transposed data matrix into the same memory page as far as possible so as to data access time by using the page-mode function. However, the present invention is not limited to these embodiments.

Figure 7A:
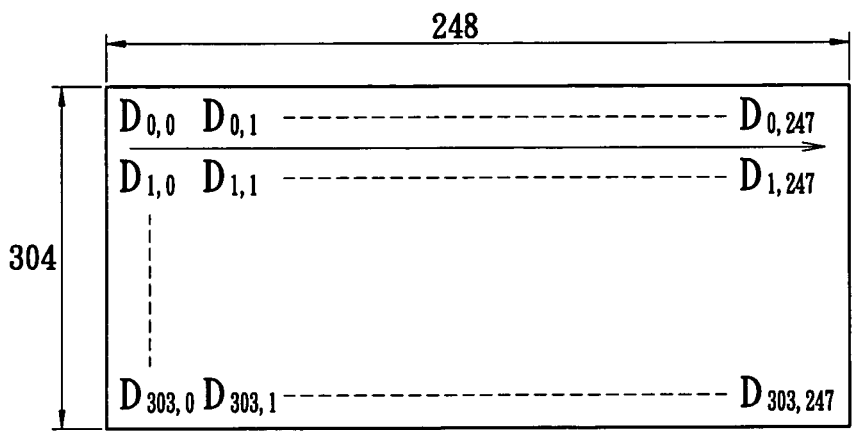
FIGS. 7A-F illustrate the data arrangements of the LDC data inside the DRAM in accordance with the present invention.

As shown in FIG. 7A, the data arrangement of the LDC data stored in the DRAM 307 is the same as that of the transposed data matrix; i.e., the data is stored into the DRAM 307 according to the arrangement order of the transposed data matrix. The data in the same row of the transposed data matrix thus have the same row address.

Figure 7B:
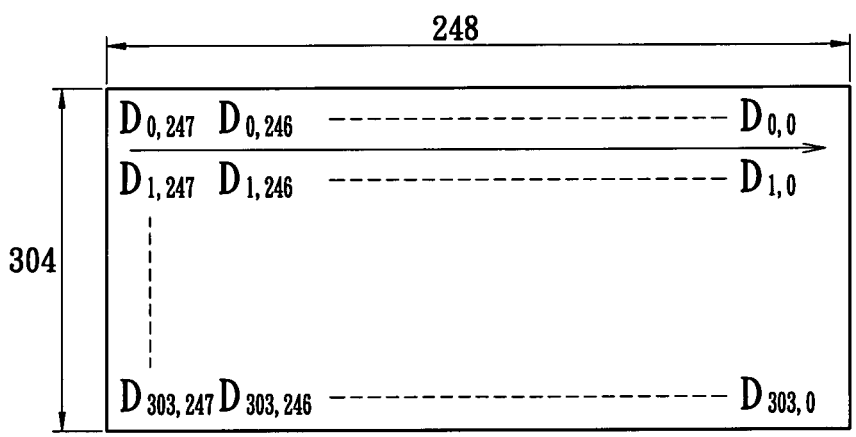

As shown in FIG. 7B, the data arrangement of the LDC data stored in the DRAM 307 is contrary to that of the transposed data matrix; i.e. the row arrangement of the data stored into the DRAM 307 is contrary to the row arrangement of the transposed data matrix. The data in the same row of the transposed data matrix can thus still have the same row address.

Figure 7C:
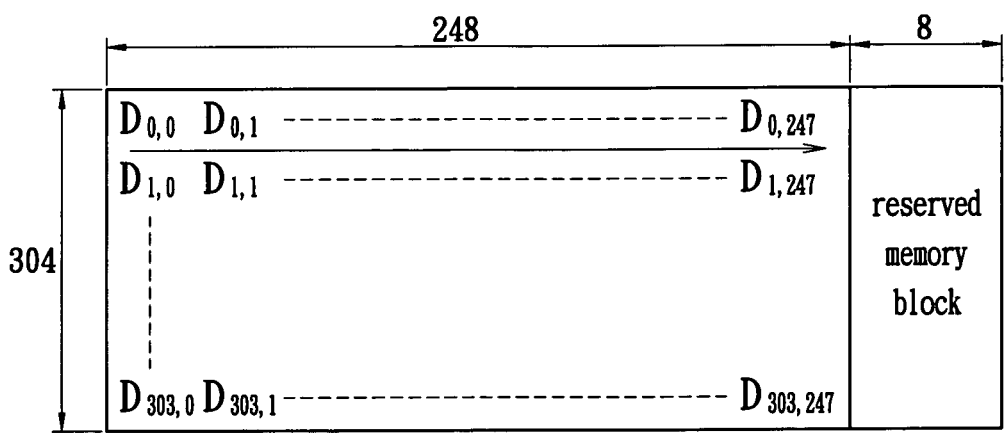

As shown in FIG. 7C, the data arrangement of the LDC data stored in the DRAM 307 is the same as that of the transposed data matrix; i.e., the data is stored into the DRAM 307 according to the arrangement order of the transposed data matrix. The data in the same row of the transposed data matrix thus have the same row address. The difference between the data arrangements shown in FIGS. 7A and 7C is that the data arrangement shown in FIG. 7C reserves a memory block for use in the future.

Figure 7D:
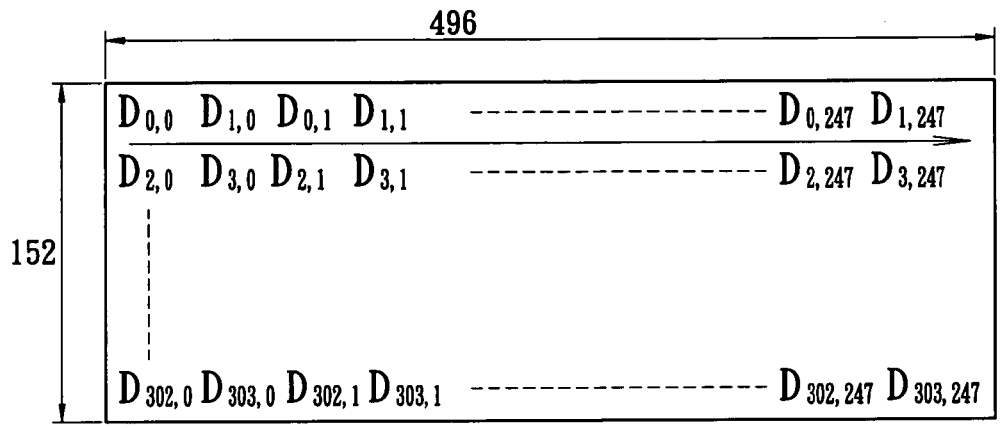

As shown in FIG. 7D, this embodiment directly stores the LDC data, which are not completely de-interleaved, into the DRAM 307. Every two LDC codes are interleaved and placed in order in the DRAM 307. For example, the data stored in the row address #0 of the DRAM 307 is formed by interleaving the data in rows #0-1 of the transposed data matrix ($D_{0-1,j}$, j=0-247) and the data stored in the row address #151 of the DRAM 307 is formed by interleaving the data in rows #302-303 of the transposed data matrix ($D_{302-303,j}$, j=0-247).

Figure 7E:
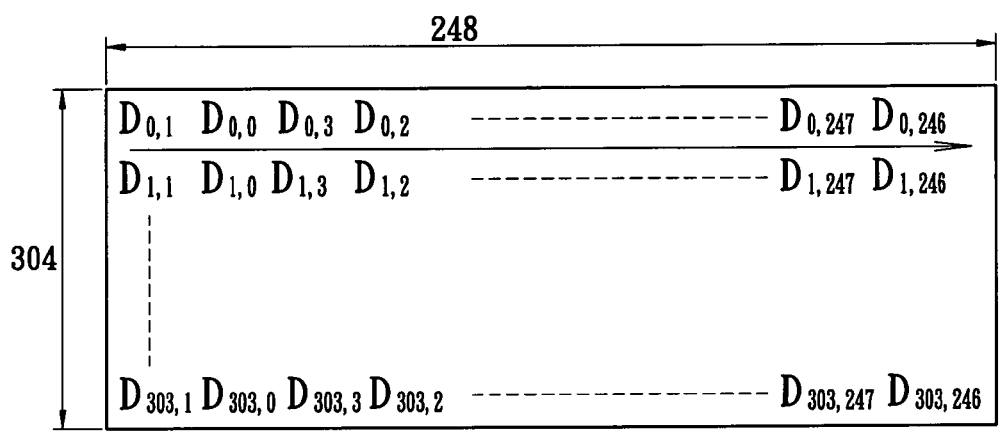

As shown in FIG. 7E, this embodiment uses a word (i.e. two bytes) as a unit to store the data in the same row of the transposed data matrix into the same memory page. For example, the data in row #0 of the transposed data matrix ($D_{0,j}$, j=0-247) is stored into the row address #0 of the DRAM 307 by using words as storage units.

Figure 7F:
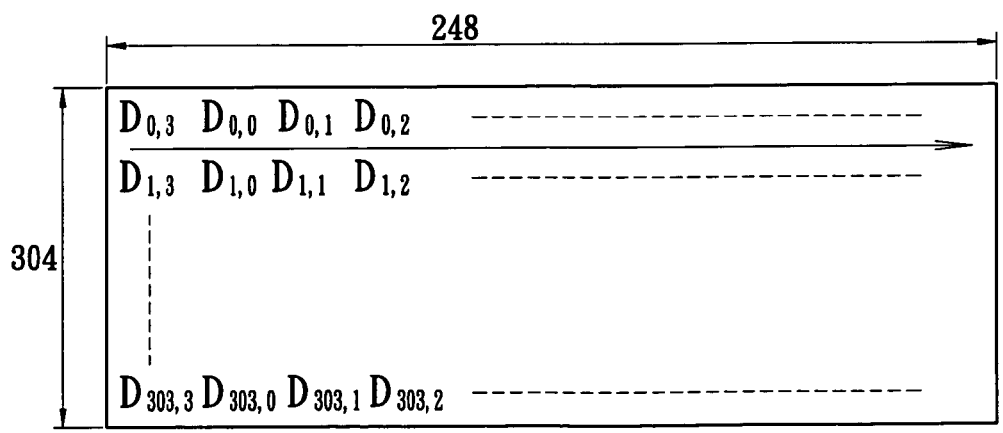

As shown in FIG. 7F, this embodiment illustrates an example of using multiple bytes as a unit to store the data in the same row of the transposed data matrix into the same memory page. This embodiment exemplarily uses four bytes as a storage unit. For example, the data in row #0 of the transposed data matrix ($D_{0,j}$, j=0-247) is stored into the row address #0 of the DRAM 307 by using four bytes as a storage unit.

Furthermore, although the embodiments described above emphasize the accessing operation of the LDC data, the accessing/transferring apparatus mentioned above can also be used in the accessing operation of the BIS data to further improve the accessing efficiency of the Blu-ray disk because the encoding method and steps of the BIS data are similar to that of the LDC data.

The BIS block is also a data matrix with multiple rows and columns. However, the BIS data is stored in the optical disk in order by using the data matrix as a unit. The arrangement order of the modulation data of the BIS data stored in the optical disk has a corresponding relation to the arrangement order of the BIS block so as to form the interleaved error correction modulation block.

Reference is made to FIG. 3 again. In the accessing process of the BIS data, the accessing/transferring apparatus 300 will first use the accessing device 317 to access the interleaved error correction modulation block from the optical data storage media, e.g. the optical disk, and demodulate it to form a interleaved error correction block. Subsequently, the accessing/transferring apparatus 300 will use the SRAM 303 to store the data in the interleaved error correction block temporarily and use the DRAM 307 for storing the data of the BIS block.

The accessing/transferring apparatus 300 will use the second de-interleaver 305 to perform a de-interleaving calculation on the source data so as to produce de-interleaving addresses of the DRAM 307 and SARM 303. Then, the accessing/transferring apparatus 300 will recover the BIS block via taking out the data of the interleaved error correction block from the SRAM 303 and storing them in the DRAM 307 according to the de-interleaving addresses of the DRAM 307 and SARM 303. Using the de-interleaving addresses of the DRAM 307 will make the portion of data in the same column of the BIS block stored in a particular locality greater than the portion of data in the same row of the BIS block stored in a particular locality.

The accessing/transferring apparatus 300 will then use the error correction decoder 309 to access the column data of the BIS block to perform an error correction process and use the host interface 315 to access and output the column data of the corrected BIS block.

Figure 3A:
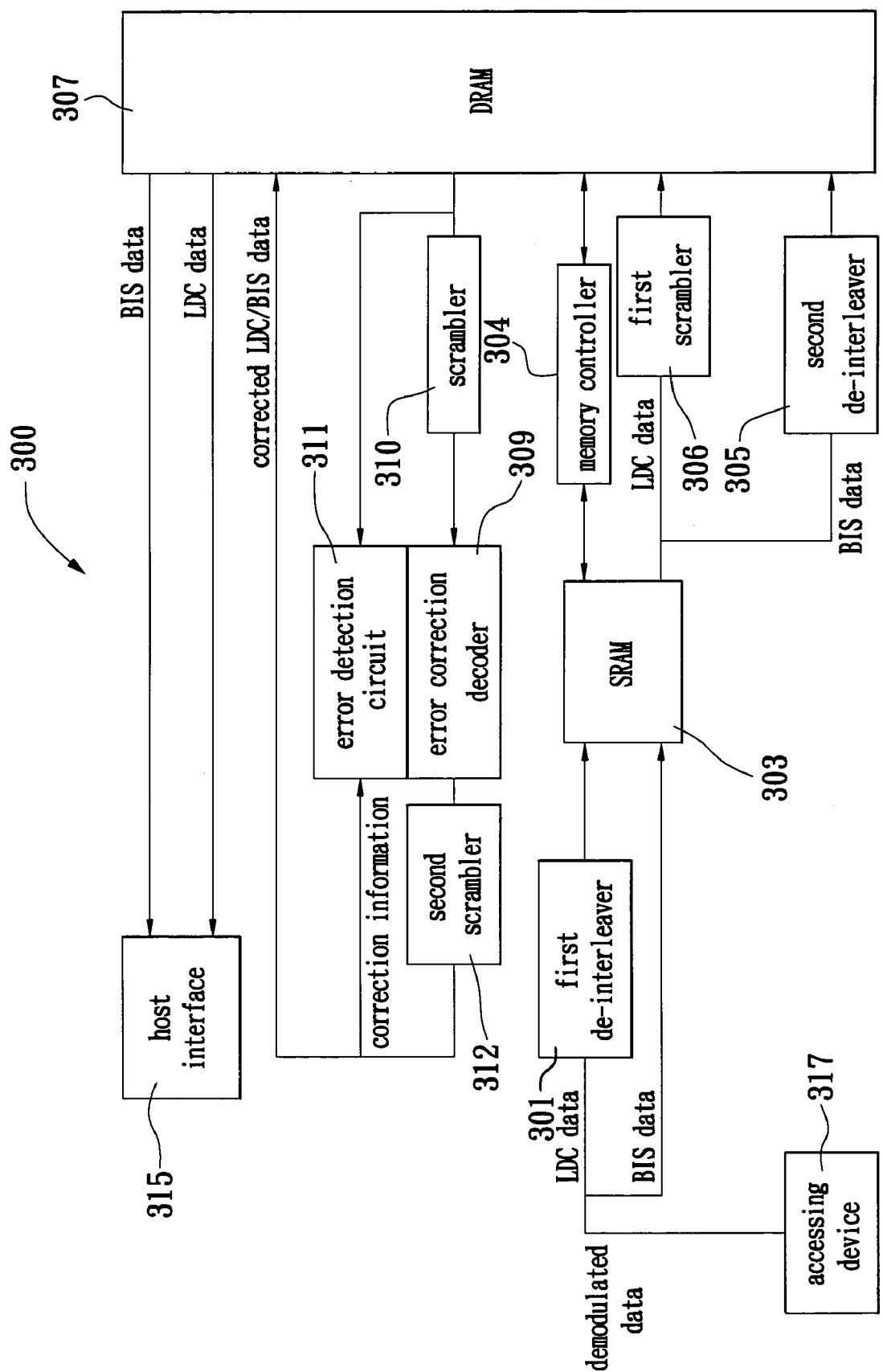
FIG. 3A is a block diagram of the second preferred embodiment in accordance with the present invention.

Reference is made to FIG. 3A, which is a block diagram of the second preferred embodiment in accordance with the present invention. The main differences between the second and first embodiments of the present invention are that the second removes the de-scrambler 313 and adds a first de-scrambler 305, a scrambler 310 and a second de-scrambler 312.

As shown in the figure, before the LDC data are stored into the DRAM 307, the first de-scrambler 305 will de-scramble the LDC data to recover the original data, which can be read and used directly. Then, the first de-scrambler 305 will store the original data to the DRAM 307. By this way, the host can access and use these data directly via the host interface 315 and does not need to perform a de-scrambling calculation.

However, in the error correction process, the error correction decoder 309 can only perform the error correction calculation by using not de-scrambled LCD data. Hence, before performing the error correction calculation, the original data stored in the DRAM 307 should be scrambled by the scrambler 310. Then, the scrambled data will be delivered to the error correction decoder 309 for error correction.

After the error correction decoder 309 finishes the error correction calculation, the corrected LDC data will be de-scrambled by the second de-scrambler 312 to make the corrected portion of the LCD data the same in form as the original data and then store the same in the DRAM 307 to correct the original data in the DRAM 307.

Figure 3B:
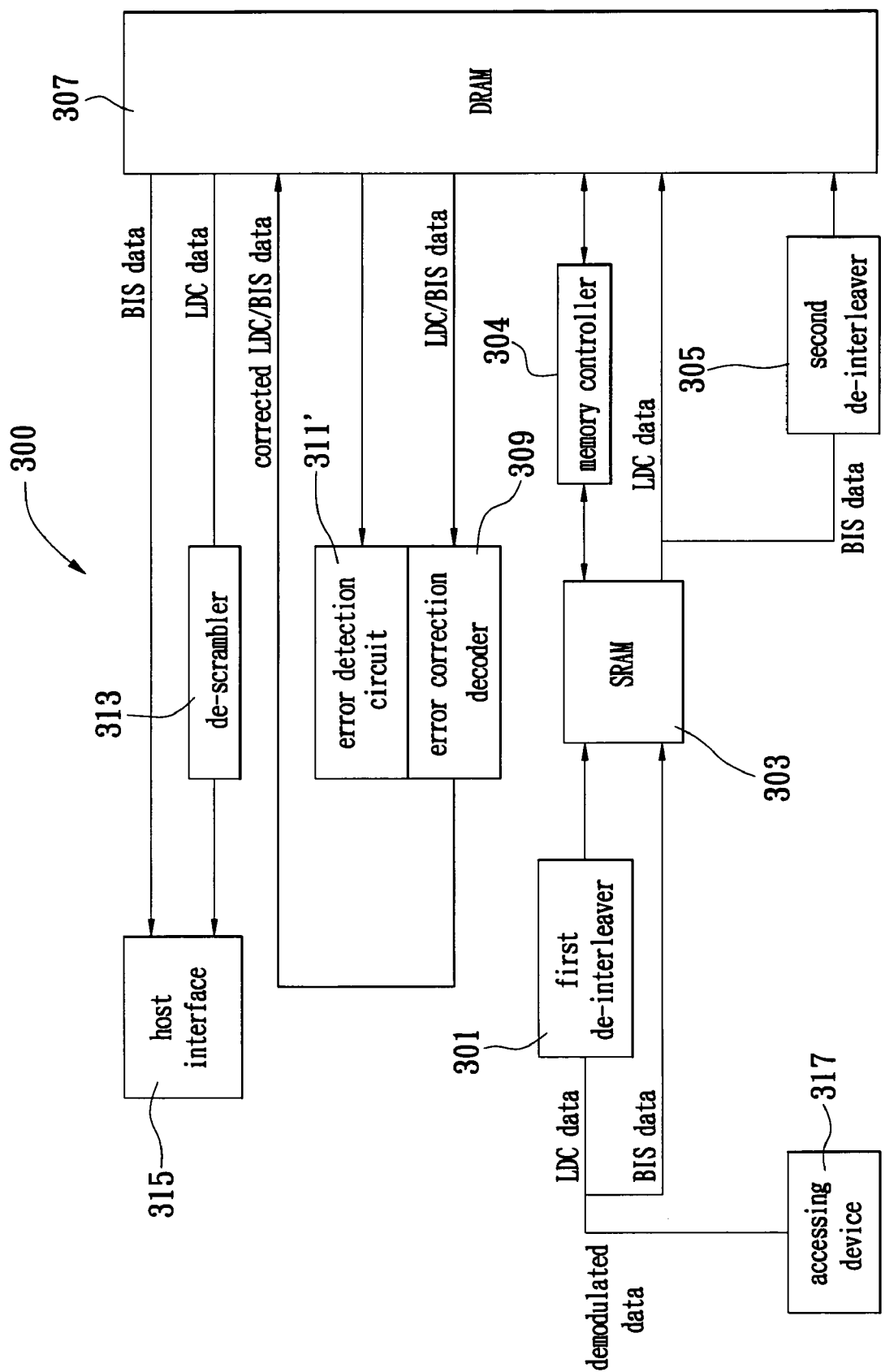
FIG. 3B is a block diagram of the third preferred embodiment in accordance with the present invention.

Reference is made to FIG. 3B, which is a block diagram of the third preferred embodiment in accordance with the present invention. The difference between the third and the first embodiments is that an error detection circuit 311' is used to replace the error detection circuit 311. The error detection circuit 311 of the first embodiment detects errors by directly using the uncorrection information inside the DRAM 307 and the correction information output from the error correction decoder 309. However, the error detection circuit 311' of the third embodiment detects the errors by using the correction information inside the DRAM 307.

Figure 3C:
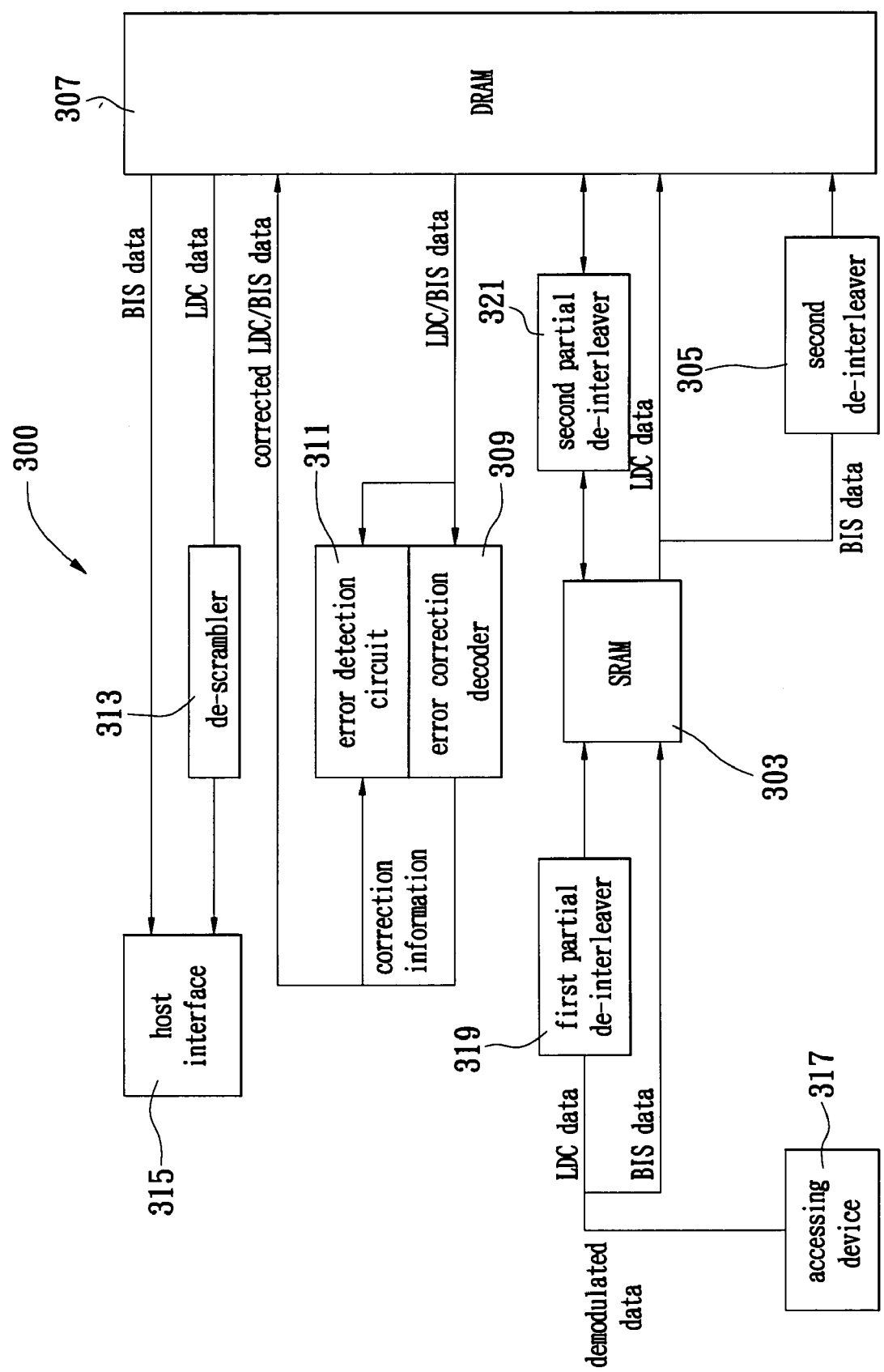
FIG. 3C is a block diagram of the fourth preferred embodiment in accordance with the present invention.

Reference is made to FIG. 3C, which is a block diagram of the fourth preferred embodiment in accordance with the present invention. The difference between the fourth and the first embodiments is that a first partial de-interleaver 319 and a second partial de-interleaver 321 are used to replace the first de-interleaver 301.

Since the data of the interleaved error correction block accessed from the optical storage media should be de-interleaved to recover the LDC data by executing two kinds of de-interleaving calculations, the fourth preferred embodiment uses the first partial de-interleaver 319 and second partial de-interleaver 321 to perform these two kinds of de-interleaving calculations respectively. It should be noted that the first partial de-interleaver 319 and second partial de-interleaver 321 can use different method to perform the de-interleaving calculations.

For example, the first partial de-interleaver 319 can directly de-interleave the LDC data while the second partial de-interleaver 321 performs the de-interleaving calculation by generating de-interleaving addresses. Alternatively, the second partial de-interleaver 321 can also directly de-interleave the LDC data while the first partial de-interleaver 319 performs the de-interleaving calculation by generating de-interleaving addresses.

According to the description above, since the present invention can use the page-mode function of the DRAM to access the data of the error correction block (including LDC and BIS blocks) in the error correction process and during transmitting the data to the host, the present invention can improve the efficiency of the error correction process and the transmission process considerably.

Although the present invention has been described with reference to the preferred embodiment thereof, it will be understood that the invention is not limited to the details thereof Various substitutions and modifications have been suggested in the foregoing description, and other will occur to those of ordinary skill in the art. Therefore, all such substitutions and modifications are embraced within the scope of the invention as defined in the appended claims.

What is claimed is:

1. An apparatus for accessing and transferring optical data, the apparatus performing an error correction process on an error correction block, and the error correction block comprising a data matrix with a plurality of columns and a plurality of rows, wherein each column of the data matrix is a decoding set, the data matrix is recorded on an optical storage medium in a row direction to form an error correction modulation block, and a data arrangement order in each row of the error correction modulation block has a relation to a data arrangement order in each row of the error correction block, the apparatus comprising:

a first memory configured to store the data of the error correction block and supporting a page-mode function;

an accessing device configured to access the error correction modulation block from the optical storage medium, demodulate the error correction modulation block to recover the error correction block and store data of the error correction block in the first memory so that the data of the error correction block in the same columns are more concentrated at predetermined localities of the first memory than the data in the same rows;

an error correction decoder configured to access the data of the error correction block by column from the first memory to perform the error correction process; and a transmission interface configured to access and output the corrected error correction block by column from the first memory.

2. The apparatus as claimed in claim 1, wherein the error correction block includes target data and parity data.

3. The apparatus as claimed in claim 1, wherein the error correction block is a long distance error correction code (LDC) block or a burst indicator subcode (BIS) block.

4. The apparatus as claimed in claim 1, wherein the first memory is a dynamic random access memory (DRAM).

5. The apparatus as claimed in claim 1, further comprising a second memory to store the data of the error correction block temporarily, the second memory being electrically connected between the accessing device and the first memory, respectively.

6. The apparatus as claimed in claim 5, wherein the second memory is a static random access memory (SRAM).

7. The apparatus as claimed in claim 1, further comprising an error detection circuit to detect whether the data in the error correction block are correct or not by using the data accessed by the error correction decoder.

8. The apparatus as claimed in claim 1, wherein the transmission interface is a de-scrambler used to de-scramble the data of the error correction block.

9. The apparatus as claimed in claim 1, wherein the transmission interface is a video or audio interface used to transmit video or audio data.

10. The apparatus as claimed in claim 1, wherein the transmission interface is a host interface used to transmit the data of the error correction block to a host.

11. An apparatus for accessing and transferring optical data, the apparatus performing an error correction process on an error correction block, and the error correction block comprising a data matrix with a plurality of columns and a plurality of rows, wherein each column of the data matrix is a decoding set, the data matrix is recorded on an optical storage medium in a row direction to form an error correction modulation block, and a data arrangement order in each row of the error correction modulation block is related to a data arrangement order in each row of the error correction block, the apparatus comprising:

a first memory configured to store the data of the error correction block and supporting a page-mode function;

a second memory configured to store the data of the error correction block temporarily;

a memory controller configured to access the data of the error correction block from the second memory and store the data of the error correction block in the first memory so that the data of the error correction block in the same columns are more concentrated at predetermined localities of the first memory than the data in the same rows;

an accessing device configured to access the error correction modulation block from the optical storage medium, demodulate the error correction modulation block to recover the error correction block and store the data of the error correction block into the second memory according to a predetermined order;

an error correction decoder configured to access the data of the error correction block by column from the first memory to perform the error correction process; and a transmission interface configured to access and output the corrected error correction block by column from the first memory.

12. The apparatus as claimed in claim 11, wherein the first memory is a DRAM.

13. The apparatus as claimed in claim 11, wherein the second memory is a SRAM.

14. The apparatus as claimed in claim 11, further comprising an error detection circuit to detect whether the data of the error correction block are correct or not by using the data accessed by the error correction decoder.

15. The apparatus as claimed in claim 11, wherein the transmission interface is a de-scrambler used to de-scramble the data of the error correction block.

16. The apparatus as claimed in claim 11, wherein the transmission interfaced is a host interface used to transmit the data of the error correction block to a host.

17. The apparatus as claimed in claim 11, wherein the transmission interface is a video or audio interface used to transmit video or audio data.

18. An apparatus for accessing and transferring optical data, the apparatus performing an error correction process on an error correction block, and the error correction block comprising a data matrix with a plurality of columns and a plurality of rows, wherein each column of the data matrix is a decoding set, the data matrix is recorded on an optical storage medium in a row direction to form an error correction modulation block, and a data arrangement order in each row of the error correction modulation block is related to a data arrangement order in each row of the error correction block, the apparatus comprising:

a first memory configured to store the data of the error correction block and supporting a page-mode function;

an accessing device configured to access the error correction modulation block from the optical storage medium and demodulate the error correction modulation block to recover the error correction block;

a de-scrambler configured to de-scramble the data of the error correction block and store the de-scrambled data of the error correction block into the first memory;

a scrambler configured to scramble the de-scrambled data of the error correction block inside the first memory to recover the data of the error correction block;

an error correction decoder configured to access the data of the error correction block by column from the scrambler to perform the error correction process; and a transmission interface configured to access and output the corrected error correction block by column from the first memory;

wherein the accessing device stores the data of the error correction block into the first memory via the de-scrambler to make the data of the error correction block in the same columns are more concentrated at predetermined localities of the first memory than the data in the same rows.

* * * * *